United States Patent [19]

Duthuit et al.

[11] Patent Number: 4,812,988

[45] Date of Patent: Mar. 14, 1989

[54] PROCESSOR FOR THE ELIMINATION OF CONCEALED FACES FOR THE SYNTHESIS OF IMAGES IN THREE DIMENSIONS

[75] Inventors: Olivier Duthuit, Paris; Thierry Bonnet, Champigny; Philippe Martin, Fresnes, all of France

[73] Assignee: U.S. Philips Corporation, New York, N.Y.

[21] Appl. No.: 902,372

[22] Filed: Aug. 29, 1986

[30] Foreign Application Priority Data

Aug. 30, 1985 [FR] France ............................. 85 12925

[51] Int. Cl.$^4$ ............................................. G06F 15/72
[52] U.S. Cl. .................................. 364/522; 364/521; 340/727; 340/747
[58] Field of Search ............... 364/518, 519, 522, 523, 364/520; 340/747, 723, 727

[56] References Cited

U.S. PATENT DOCUMENTS

| | | | |
|---|---|---|---|
| 4,208,719 | 6/1980 | Lotz et al. | 364/515 |
| 4,529,978 | 7/1985 | Rupp | 340/727 |
| 4,570,233 | 2/1986 | Van et al. | 364/522 |
| 4,590,465 | 5/1986 | Fuchs | 340/723 |
| 4,667,190 | 5/1987 | Fant | 340/747 |
| 4,698,779 | 10/1987 | Holden et al. | 364/520 |
| 4,714,428 | 12/1987 | Bunker et al. | 434/43 |
| 4,758,965 | 7/1988 | Liang et al. | 364/518 |

*Primary Examiner*—Gary V. Harkcom
*Assistant Examiner*—Randy W. Lacasse
*Attorney, Agent, or Firm*—Brian J. Wieghaus

[57] ABSTRACT

A processor of images of objects described in three dimensions for determining parameters of pixels on a display screen. The processor possesses inputs for parameters of convex polygons describing the objects in a frame of visualization and determines from the parameters of the polygons the parameters of the pixels of a transformed two-dimensional image of that object. In order to eliminate concealed faces of objects displayed on the screen from a perspective view, the processor selects and stores the parameters of all the elements of the transformed image which are closest to the plane of visualization (the display screen). The image processor is noteworthy in that it serially processes, by pipeline organization, the parameters of a set of segments which constitute the intersections of the set of polygons with each line of visualization of the visual display device, a plurality of segments being processed simultaneously. The parameters of the segments being obtained by previous conversion of the parameters of the polygons. The processor comprises n blocks, each allocated to the serial processing of the pipeline type of the parameters of one of the n pixels of a line of visualization, each block comprising: a decrementor, a validation element and a basic cell which receives and stores parameters of depth and of color and determines new ones, and which then transmits color parameters to a visual display device. According to a further variant, the image processor also includes a circuit for the conversion of the parameters of polygons into parameters of segments.

12 Claims, 9 Drawing Sheets

PROCESSOR FOR THE ELIMINATION OF CONCEALED FACES FOR THE SYNTHESIS OF IMAGES IN THREE DIMENSIONS

BACKGROUND OF THE INVENTION

The invention relates to a processor of images of objects described in three dimensions, which possesses input means for parameters of convex polygons descriptive of such objects in a frame of visual visualization, means for determining, from the parameters of the polygons, the parameters of the pixels of a transformed two-dimensional image of that object, which transformed two-dimensional image is represented in the plane of visualization of a display device, means for selecting and storing the parameters of all the elements of the transformed image which are closest to the plane of visualization, in order to eliminate the concealed faces of the objects, the latter being represented under an angle of observation selected from among a set of angles.

The invention likewise relates to any system of representation of images of objects in three dimensions, which system uses such an image processor.

Three-dimensional (30) graphics rely on he definition of the geometry of the object in three dimensions, then on the displacement of the object in a system of coordinates, and finally on the drawing of the object in the plane of a visual display screen. The basic operations of this displacement are rotation, translation, scaling and perspective. The perspective effect permits restoration of the shape of the object in its depth, and this is simulated in a manner similar to that which the human eye perceives. The object is first of all described in a frame, in the form of spatial coordinates, and then, after the aforegoing operations of displacement, this system of coordinates is transformed according to the system of coordinates of the visual display device. With this purely geometric description there are associated attribute parameters such as shade, colour, texture or transparency, which assure a better rendering of the object in three dimensions on a two-dimensional screen.

The objects are described according to lines, curves or planes, which can themselves be translated into algebraic expressions. According to a widespread procedure, the objects are described according to a set of plane surfaces formed from a succession of convex polygons. The latter must have fairly small dimensions, in order to represent the curved surfaces in a satisfactory manner. The basic method for representing a polygon consists in formulating a list of coordinates of apices, the space delimited by the polygons having to be closed. These polygons may then be described, for example, by plane equations, in order to permit the displacement of the objects in the system of coordinates.

For the restoration of the image of the object, an angle of vision is selected, from which an observer can observe only a certain number of faces of the object, the others necessarily being concealed from him.

In order that this image should represent the object in a clearer, more legible manner, and should not produce an erroneous visual appearance, the techniques of representation of images in three dimensions utilize, in order to eliminate the concealed faces, the method referred to as the "Z-buffer algorithm".

The principle consists in imagining the visual display screen in the form of a box having quasi-infinite depth. The surface of the visual display screen is broken down into a certain number of image elements which are regularly distributed in X and Y. From the angle of vision selected, all the polygons are successively analyzed according to this two-dimensional configuration of the image elements.

At the start of processing, depth coordinates ZM which have been stored are initialized with the furthest coordinate admissible by the system. After this, the processing of each polygon will take place in such a manner that each coordinate Z, associated with each image element contained in a polygon, is compared with the depth coordinate ZM stored in the depth store. When Z is less than ZM, this coordinate ZM is replaced by the coordinate Z which thus becomes the new coordinate ZM associated with the image element. All the polygons constituting the description of the object are analyzed successively, and thus there are conserved for each image element only the data ZM and the attribute parameters C concerning only the points which are closest to the selected point of observation. Thus, the concealed surfaces are not apparent on the screen.

In order to assure the restoration of the three-dimensional object by an image, visualization is carried out of the attributive parameters associated with each face of the object corresponding to each polygon represented. These attribute parameters are also stored in an attribute store. In order to avoid a situation in which sudden variations of color or of shade appear on edges or apices, it is possible to effect an attribute interpolation in one or more directions. Thus, the attributes are defined for the apices of each polygon, and then the attributes of the intermediate image elements are interpolated in order to complete the polygon. This permits a realistic appearance to be imparted to the restored image.

All these mechanisms of representation in three dimensions of images of objects are implemented in the processor described in the publication entitled: "Developing pixel-planes, a smart memory-based raster graphics system", H. FUCHS, J. POULTON, A. PAETH, A. BELL, 1982, Conference on Advanced Research in VLSI, M.I.T. January 27, pages 137, 146. A description is given therein of a system which: identifies all the pixels which are situated in a polygon, determines the pixels which are not masked by previously processed polygons, and determines the color attribute of each pixel.

The speed is determined by proceeding in such a manner that processing is carried out simultaneously on all the pixels, and, in order to achieve this, the system operates on th equation of the plane of the polygon $f(x,y)=Ax+By+C$, in which x and y are the coordinates of a pixel and the coefficients A, B, C are dependent upon the polygon to be processed.

Such processing, with the aid of the equations of the plane of the polygon, ensures that the architecture is two-dimensional, the coefficients A, B, C being introduced by means of a tree structure.

Such a processor presents difficulties. In the first place, in order to process the equation of the plane globally, it is necessary to have available a two-dimensional network of basic cells for processing. In this case, the surface of the integrated circuit is very large. Secondly, a consequence of the aforegoing is that the speed of operation is relatively restricted.

SUMMARY OF THE INVENTION

The object of the invention is to eliminate these difficulties and to define a processor, the functional organisation of which permits very rapid processing of the information, with a very small surface occupied on the semiconductor which makes up the integrated circuit. The invention thus imparts to the processor a structure composed of blocks operating in the serial mode, with processing of the pipeline type distributed among the parameters relating to the pixels: (X, Y), Z, attributes. In order to reduce the semiconductor surface used, the invention operates a line-by-line analysis of the plane of visualization.

In order to promote this rapidity of processing, another object of the invention is to permit the renewable cyclic introduction of the coordinates and of the increments given to the parameters characterizing the polygons.

To this end, the invention as defined in the preamble is noteworthy in that it includes means for serial processing, of the pipeline type, of parameters of a set of segments which constitute the intersections of the set of polygons with each line of visualization of the visual display device, a plurality of segments being processed simultaneously, the said parameters of the segments being obtained by previous conversion of the parameters of the polygons.

The parameters of the segments may be introduced bit by bit into the serial processing means of the pipeline type. They may also be introduced by groups of bits.

It is also noteworthy in that it includes means for generating incrementally, for each line of visualization of the visual display device, the set of intersections (segments) of the set of polygons with the line of visualization.

The invention is likewise noteworthy in that the image processor, to which are supplied the parameters of polygons converted into a set of segments, which are supplied thereto in the form of coordinates of extremities $XM_0$, $XN_0$ of coordinates and depth increments $Z_0$ and $dZ_0$ and of parameters and increments of attributes $C_0$ and $dC_0$ relating to each segment, possesses means for serial processing of the pipeline type which include n blocks, each allocated to the serial processing of the parameters of one of the n image elements of one line of visualization, the k-th block including (with $1 \leq k \leq n$):

a decrementor receiving the coordinates ($XM_{k-1}$, $KN_{k-1}$) which it decrements by one binary unit such as: $XM_k = XM_{k-1} - 1$, $XN_k = XN_{k-1} - 1$, a validation element which receives respectively the signs ($SM_k$, $SN_k$) of the results ($XM_k$, $XN_k$) supplied by the decrementor, and determines a validation signal $FL_k$ such that $FL_k = SM_k \cdot \overline{SN_k}$, (the symbol (.) designating the AND logic operation), with $FL_k = 1$ if the image element analyzed is affected by the coordinates ($XM_k$, $XN_k$) and $FL_k = 0$ in the opposite case;

a basic cell, which receives the parameters $Z_{k-1}$, $dZ_{k-1}$, $C_{k-1}$, $dC_{k-1}$, which, under the control of the signal $FL_k = 1$, determines the parameters $Z_k$, $C_k$, $dZ_k$, $dC_k$ for the following basic cell, which stores the parameters $Z_{k-1}$ and compares them with stored old values $Zc_k(\text{old})$ and stores values $Zc_k(\text{new})$ such that:

$Zc_k(\text{new}) = Zc_k(\text{old})$ if $Z_{k-1} \geq Zc_k(\text{old})$ $Zc_k(\text{new}) = Z_{k-1}$ if $Z_{k-1} < Zc_k(\text{old})$, which stores the attributes $C_{k-1}$ associated with the new stored values $Zc_k$, which transmits the attributes $C_{k-1}$ to an external bus.

The set of coordinates of segments affects i segments with $1 \leq i \leq m$, i.e. ($XM_{0i}$, $XN_{0i}$). Any data item of type $A(X, Z, \ldots)$ associated with the segment i, is propagated successively in the n blocks indexed by k. In each block, this data item $A_{ki}$ is subjected to elementary processing prior to transmission thereof to the block $k+1$. In order to simplify the notations, the index i of the segment has been omitted hereinabove.

First of all, the initial representation of the polygons by their apices and their edges is transformed into a representation by segments corresponding to the intersection of each polygon with a scanning plane perpendicular to the plane of visualization. Each polygon $Pm$, the intersection of which with the line of visualization is not empty, will cut the scanning plane so as to form a segment.

According to a first embodiment, the image processor includes means for serial processing, of the pipeline type, of the parameters of the segments, to which there are supplied the parameters of m polygons $Pm$ converted into a set of coordinates of segments ($XM_0$, $XN_0$), as well as parameters and depth increments $Z_0$ and $dZ_0$, and parameters and increments of attributes $C_0$ and $dC_0$ relating to each segment ($M_0$, $N_0$).

In the initial frame, which is dimensioned in X and Y as a function of the size of the screen, an apex of a polygon will be recorded by the coordinates $Xu$, $Yu$, $Zu$, $Cu$. The following increments are defined:

$$IX_u = \frac{X_{u+1} - X_u}{LY_u} \text{ with } LY_u = Y_{u+1} - Y_u$$

$$IZ_u = \frac{Z_{u+1} - Z_u}{LY_u}, IC_u = \frac{C_{u+1} - C_u}{LY_u}$$

where u characterizes an apex and $u+1$ the adjacent apex. When the scanning plane is displaced by an increment $IY = 1$, the consecutive segments which are obtained will be displaced by an increment IX in the direction X and IZ in the direction Z. While operating with increments IY of value 1, all the possible points in the direction Y are thus consecutively explored. Each segment may then be represented by its extreme parameters ($XM_0$, $XN_0$), ($ZM_0$, $ZN_0$), ($CM_0$, $CN_0$), the consecutive analog values of the other segments being deduced from each other by an increment IX in the direction X, IZ in the direction Z and IC in the "direction" C. Likewise, in each scanning plane, it is possible to analyze each segment by operating increments of value $dX = 1$. In this case, the increment according to Z is equal to $$dZ_0 = \frac{ZN_0 - ZM_0}{XN_0 - XM_0}$$

which is constant for the entire plane and according to C the following applies:

$$dC_0 = \frac{CN_0 - CM_0}{XN_0 - XM_0}$$

According to a second embodiment, the image processor comprises:
means for converting the parameters of polygons into parameters of segments which constitute the intersections of the set of polygons with each line of visualization of the visual display device,
and means for serial processing, of the pipeline type, of the parameters of the segments, a plurality of segments being processed simultaneously.

The decrementor permits determination of the position of the segment in the line of visualization, notably by verifying the signs of the results obtained at the output of the decrementor. Only in the case where the signs of these results are opposite, the validation element generates a signal $FL_k=1$, which validates the operations carried out by the basic cell. The opposite signs indicate that the cell of order k is affected by the segment.

The operation of the n cells being identical, the cell of order k will be considered below. All the successive data $Z_k$ are thus processed in the same manner and are stored in a temporary register MT. On the other hand, the depth store constituted by a depth register Mp stores values $Zc_k$ which are, in the serial mode, continuously compared with the values $Z_{k-1}$ by means of a comparator. The result of this comparison is stored in a flip-flop, which controls the replacement of the old value $Zc_k$ by the new value $Z_{k-1}$, if, for the image element under consideration, the new value corresponds to a point closer to the plane of visualization than was the old value and if $FL_k=1$. The depth register Mp is looped onto itself through a multiplexer, which permits either renewal of the value in store or maintenance of the value previously stored.

When $FL_k=1$, a basic cell $B_k$ likewise processes the attribute information which may be a color attribute $C_k$. In the same manner as for the depth coordinates, a determination is made of an attributive increment $dC_k$. The basic cell $B_k$ determines the new attribute $C_k=C_{k-1}+dC_{k-1}$ and stores $C_{k-1}$ in an attribute register.

This attribute register is updated at the same time as the depth store, under the control of the same means.

The data concerning the coordinates $XM_k$, $XN_k$, $Z_k$ and the attribute $C_k$ are processed by the processor according to a procedure of the pipeline type.

In order to achieve this, time is divided into elementary periods of duration u, grouped in basic periods of duration $T=a.u$ (a being an integer, the length of the word). In the course of the period T, the processor processes the coordinates $X_k$ of a segment in the decrementor $D_k$, and the coordinates $Z_{k-1}$ and the attributes $C_{k-1}$ in the basic cell $B_k$. In the course of a basic period $T_r$, the processor processes simultaneously:
the coordinates $X_{k,r}$ of a pixel $E_k$, in fthe decrementor $D_k$;
the coordinates $Z_{k,r-1}$ of the pixel $E_k$, in the basic cell $B_k$;
the attributes $C_{k,r-2}$, of the pixel $E_k$ in the basic cell $B_k$.

This pipeline mode of serial processing ensures a high speed of execution for the image processor.

The set of the n consecutive basic cells, which process the whole of a line of the display device, are connected to a data output bus which transmits the attributive information from the image processor to a visual display device.

According to the first embodiment, the parameters of the polygons are supplied to the image processor in the form of segments ($M_0$, $N_0$) which are determined by software processed by a computer connected to the image processor.

The function of the means for converting the polygons into segments is to determine, for each line of visualization, the two points of intersection of the scanning plane at $Y=c^{te}$ with the polygon. This thus involves determining the coordinates of the left hand point $XM_0$ and of the right hand point $XN_0$. A segment is thus entirely determined by the coordinates of the points $M_0$ and $N_0$.

However, according to another embodiment of the invention, it is likewise possible for the polygons to be converted into segments $XM_0$, $XN_0$ with the aid of a circuit for converting polygons into segments.

In this case, the invention relates to a processor of objects described in three dimensions, comprising a circuit for the conversion of polygons into segments and means of the pipeline type, for serial processing the parameters of the segments. This circuit reads in an image store the coordinates and attributes concerning each polygon, as, for example, will be subsequently indicated on TABLE 1.

The principle of this circuit is to cause the set of variables X, (or Z, respectively), (or C, respectively) to circulate in a shift register, at the end of which there is placed a cell adding the output data item with the data item IX (or IZ, respectively), (or IC respectively) read in the image store. The output of the said cell is looped to the input of the shift register in such a manner that the data item is continuously determined for each line at $Y=c^{te}$. The length of the shift register is constant and may include a specified number of parameters describing polygons. Thus, for a plane at $Y=c^{te}$ represented on the screen by a line of visualization, it is of interest to be able to store, for example, 32 segments ($M_0$, $N_0$), which permits processing in real time. The control of the sequencing of the shift register is carried out by means of a command circuit which takes into account the tests for the end of an edge and for the end of polygons, and which likewise controls the operation of an address sequencer which controls the readings of the image store, which permits renewal of the polygons loaded into the shift register progressively as the processing of the data proceeds.

The invention will be better understood with reference to the following figures, which are given by way of non-limiting examples and in which:

DETAILED DESCRIPTION OF THE PREFERRED EMBODIMENTS

Figure 1:
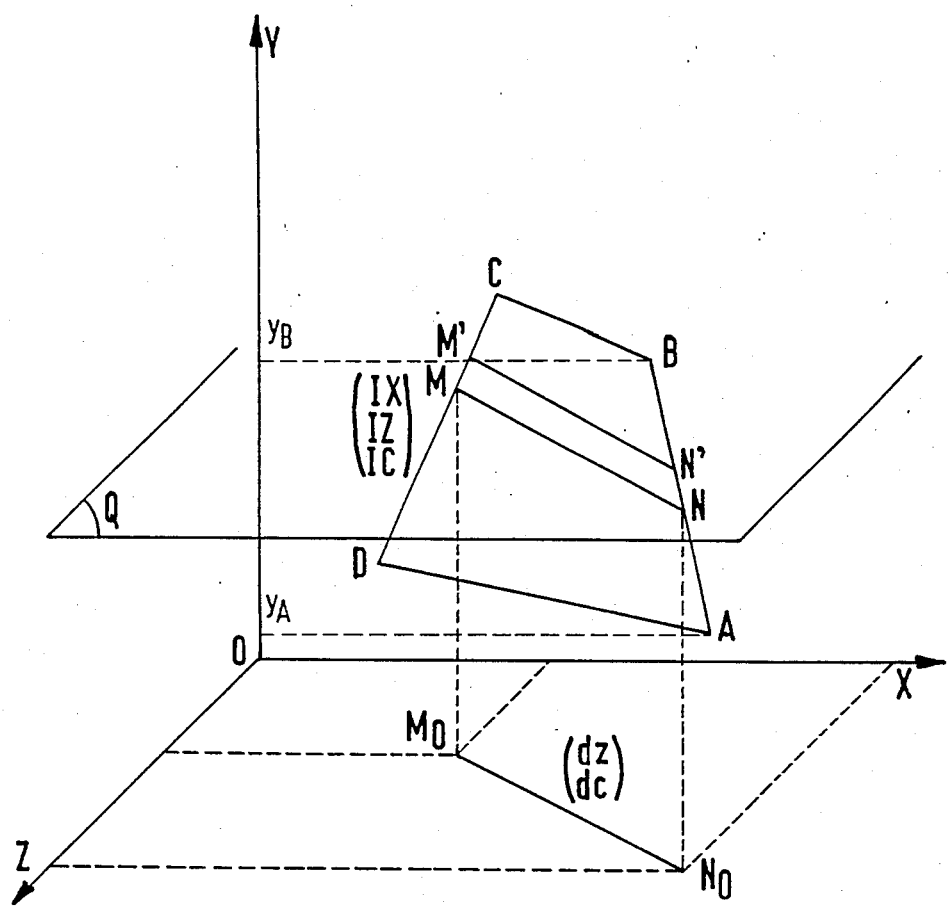
FIG. 1 shows a drawing representing the transformation of the polygons into segments.

FIG. 1 shows a plane polygon ABCD representing a facet defining a small element of the surface of an object. This polygon ABCD is defined by the coordinates of its apices, as well as by parameters of polygons. These parameters of the convex polygons, characterizing the object to be represented by a 3D image are stored in an image store. These parameters determined in a visualization frame will be, for example:

the slope dZ of the plane of the polygon in relation to planes at $Y=c^{te}$;
an initial left-hand apex (A);
the number of left-hand edges of the polygon: Narg=2;
a list of parameters for the left-hand edges,
an initial right-hand apex (A);
the number of right-hand edges of the polygon: Nard=2;
a list of parameters for the right-hand edges.

The value dZ is a constant for each polygon.

In the majority of cases, the left-hand and right hand apices are identical, for example point A. In the particular cases where the first edge encountered is parallel to the plane Q, the left-hand and right-hand apices are different.

Each edge of the polygon is determined as a displacement vector permitting the definition of a point of arrival. Each plane at $Y=c^{te}$ being deduced from the following one by increments IY=1, the edges of each polygon will be described by:
an increment in X, viz. IX;
an increment in Z, viz. IZ;
an increment of attribute, viz. IC;
the height of the edge defined by $LY=Y(end)-Y(start)$.

In the present example of the polygon ABCD, the height of the edge AB is equal to $LY=Y_B-Y_A$, and the increments are the following:

$$IX = \frac{X_B - X_A}{LY},$$

$$IZ = \frac{Z_B - Z_A}{LY} \text{ and}$$

$$IC = \frac{C_B - C_A}{LY}.$$

For each one of the four edges, it is possible in this manner to determine LY, IX, IZ and IC. The presentation of an image on a screen requires the definition of a scanning plane of the image in order to assure sequential processing of the operations. This scanning plane is identified by the letter Q on the drawing of FIG. 1 in the frame XYZ, where the direction Z indicates the direction perpendicular to the screen, behind the latter.

The polygon ABCD intersects the plane Q according to the segment MN. Thus, the seccessive scanning planes will in each instance intersect the polygon ABCD according to segments MN, M'N', etc. .... The point N' has a distance from the point N such that $|YN-YN'|=1$ or IY=1, and the coordinates of the point N' will be obtained by utilizing the increments IX, IZ, IC, and in the case of the coordinates XN the following equation will be applicable: $XN'=XN+IX$. Each scanning plane determines in each instance a line of visualization on the screen.

In this manner, it is possible to determine the coordinates of all the segments MN, separated by a distance of IY=1, which are the intersections of the polygon ABCD with the successive planes Q. Each segment MN gives, in the plane XOZ, a segment $M_0N_0$. If the segment $M_0N_0$ is traversed with an increment such as IX=1, the Z coordinates of the points thus determined will be distant by a fixed increment:

$$dZ_0 = \frac{ZN_0 - ZN_0}{XN_0 - XM_0}$$

as well as:

$$dC_0 = \frac{CN_0 - CM_0}{XN_0 - XM_0}$$

The image processor accordingly effects the processing of the coordinates XM, XN, Z, of the increments $dZ_0$ and $dC_0$ and of the attribute C concerning all the segments $M_0N_0$ of all the polygons ABCD describing the object.

In order to be able to process all of these parameters of the segments, it is necessary to convert the parameters of the polygons in the form in which they are stored in the image store. This conversion is undertaken by converting means.

The function of the means for converting the polygons into segments is to determine, for each scanning line at $Y=c^{te}$ the two points of intersection (M,N) of the scanning plane at $Y=c^{te}$ with the polygon. What is accordingly involved is thus the subsequent determination of the coordinates of the left-hand point $XM_0$ and of the right-hand point $XN_0$. A segment is thus entirely determined by the coordinates of the points $M_0$ and $N_0$.

The point $M_0$ is characterized by:
a left-hand abscissa: $XM_0$
a left-hand depth: $ZM_0$
a left-hand attribute: $CM_0$.

The point $N_0$ is characterized by:
a right-hand abscissa: $XN_0$
a right-hand depth: $ZN_0$
a right-hand attribute: $CN_0$.

The slope dZ at $Y=C^{te}$ relating to the polygon also concerns the segment.

For a given polygon, the following parameters will thus be available:

TABLE I

| | | |
|---|---|---|
| on the left: | dZ | |
| | $XM_O$ | |
| | $ZM_O$ | |
| | $CM_O$ | |
| | Narg | |
| edge i | IX<br>IZ<br>IC<br>LY | repeated (Narg) times for the polygon |
| on the right: | $XN_O$ | |
| | $ZN_O$ | |
| | $CN_O$ | |
| | Nard | |
| edge 1 | IX<br>IZ<br>IC<br>LY | repeated (Nard) times for the polygon |

The software will thus process all the polygons and for each $Y=c^{te}$ determine the coordinates of the points $XM_0$, $XN_0$. These values are then input into the image processor in order to be processed therein as has just been stated.

Figure 2:
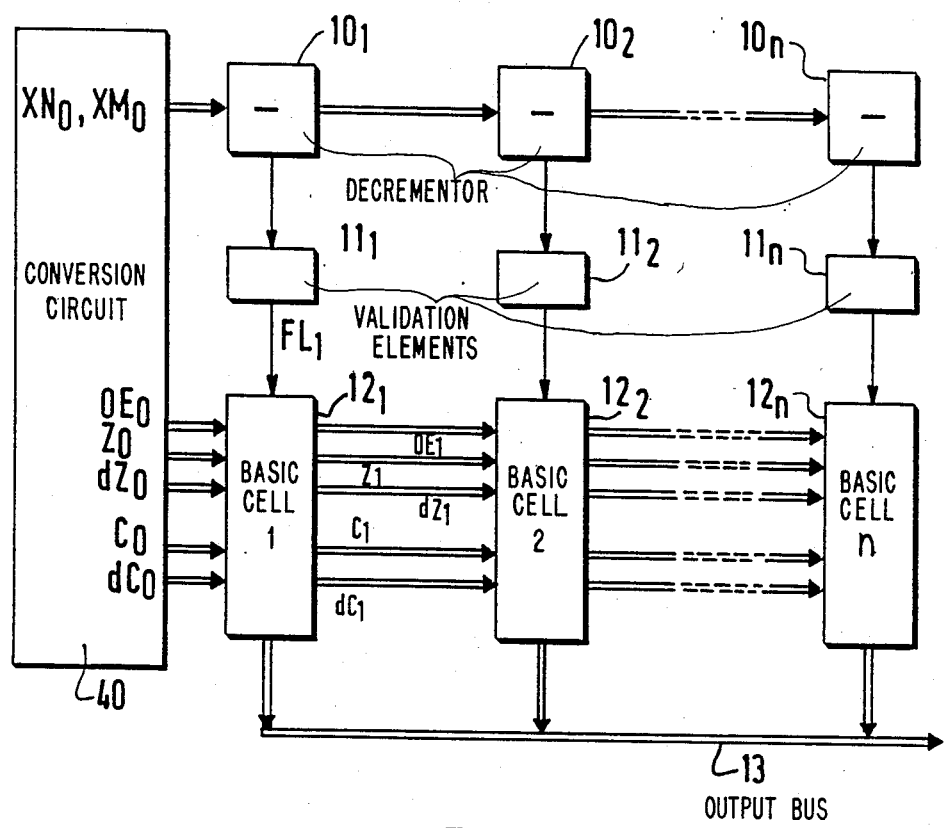
FIG. 2 shows a block diagram of the image processor according to the invention.

The block diagram of the means for serial processing of the image processor is represented in FIG. 2. The coordinates $XM_0$, $XN_0$ of the segment $M_0N_0$ are input with the least significant bit at the head in a decrementor $10_1$ which subtracts a binary unit from the data.

The signs $SM_1$ and $SN_1$ of the results of the decrementation of the data $XM_0$ and $XN_0$ are stored in the validation element $11_1$. If, after the decrementation, the result is negative on $XM_1(=XM_0-1)$ or $XN_1(=XN_0-1)$, respectively, $SM_1$ or $SN_1$ are, for example, located at logic status 1. In the opposite case, $SM_1$ and/or $SN_1$ are then placed at logic status 0. The validation element $11_1$ determines the logic status of the signal $FL_1$ defined by $FL_1=SM_1\cdot \overline{SN_1}$. The signal $FL_1$ is input into the basic cell $12_1$. The part of the circuit constituted by the decrementor $10_1$, by the validation element $11_1$ and by the basic cell $12_1$ is repeated n times consecutively (n being the number of pixels in a line of visualization). The output of the decrementor $10_1$ is connected to the input of the decrementor $10_2$, which effects the same type of operation but one the coordinates $XM_1$, $XN_1$. This is reproduced up to the decrementor $10_n$. The validation elements $11_2 \ldots 11_n$ are respectively allocated to the decrementors $10_2 \ldots 10_n$ and effect the same tests as the validation element $11_1$. The validation elements $11_1$ to $11_n$ thus control respectively the operation of the basic cells $12_1$ to $12_n$. The decrementors in combination with their respective validation element serve to determine the position of the segment in the line of visualization in the course of processing. Let us consider the example of a segment $XM_0=0$, $XN_0=3$. For this example, the logic status of the signal $FL_k$ ($1 \leq k \leq n$) is determined as indicated in Table II below.

TABLE II

| Decrementor | $10_1$ | $10_2$ | $10_3$ | $10_4$ |
|---|---|---|---|---|
| $XM_k - 1$ | −1 | −2 | −3 | −4 |
| $XN_k - 1$ | 2 | 1 | 0 | −1 |
| $SM_k$ | 1 | 1 | 1 | 1 |
| $SN_k$ | 0 | 0 | 0 | 1 |
| $FL_k$ | 1 | 1 | 1 | 0 |

Table II shows that $FL_k=1$ when the segment under consideration is situated in the part of the line of visualization under consideration.

The basic cell 12 likewise receives the data $dZ_0$ and $dC_0$ which characterize the increments specific to the segment, the data $Z_0$ and $C_0$ which characterize the coordinate and the color attribute of the origin of the segment and a signal $OE_0$ representing the end of exploration of a line of visualization and of initialization of the following line. This initialization is undertaken by forcing the updating of the parameters Z and C by those of the first segment re-entering which constitutes the bottom segment. The data $XM_0$, $XN_0$, $Z_0$, $dZ_0$, $C_0$, $dC_0$ are supplied to the means for serial processing, of the pipeline type, of the image processor, by means 40 for the conversion of parameters of polygons into parameters of segments. Each cell transmits to the one which follows it the result $Z_k$ of the operation $Z_k=Z_{k-1}+(FL_k\cdot dZ_{k-1})$, the result $C_k$ of the operation $C_k=C_{k-1}+(FL_k\cdot dC_{k-1})$ as well as the two increments $dZ_k$ and $dC_k$.

The attributive results determined by each basic cell $12_1 \ldots 12_k \ldots 12_n$ are read by means of an output bus 13.

Figure 3:
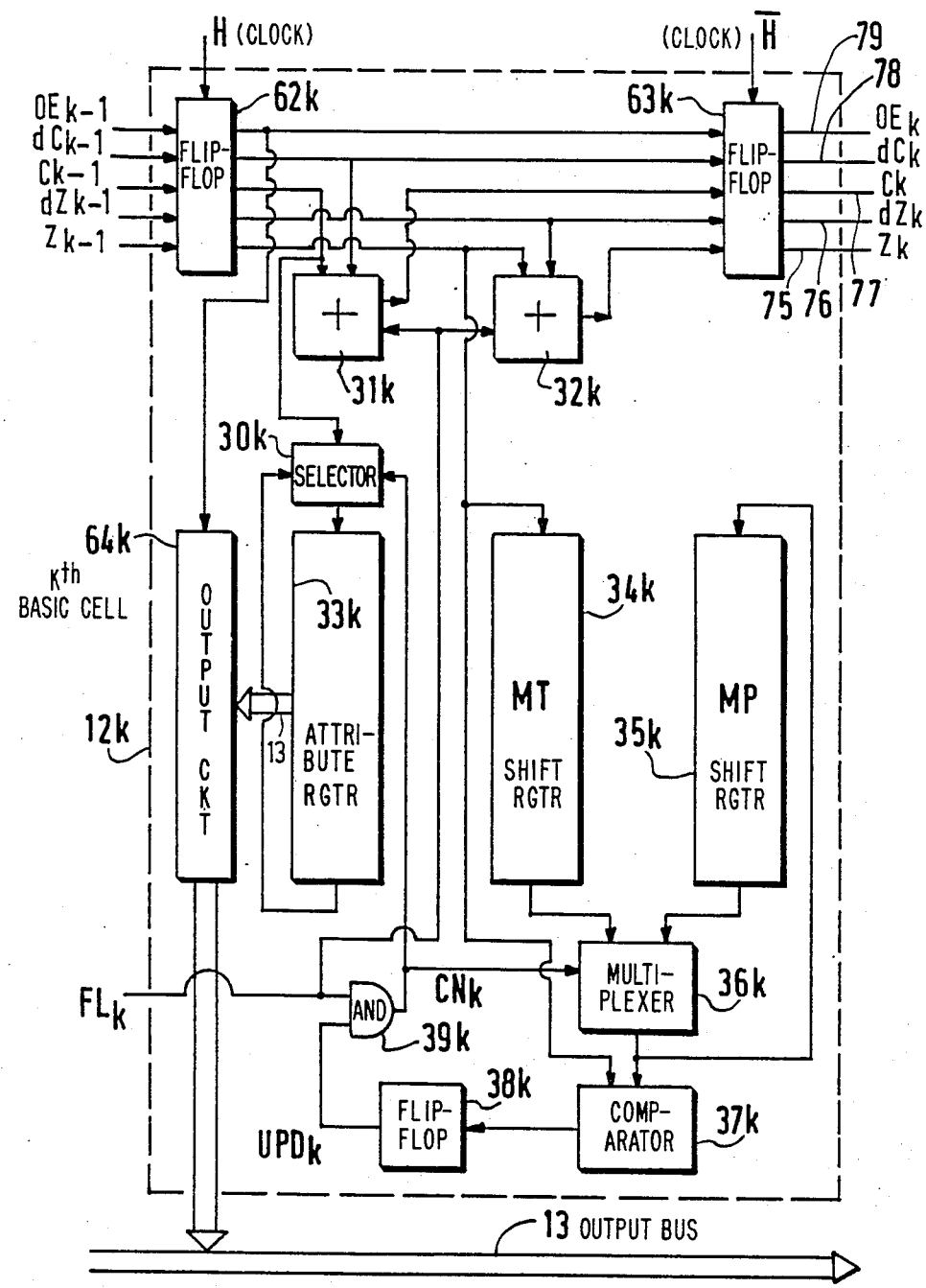
FIG. 3 shows a block diagram of a basic cell forming part of the means for serial processing of the pipeline type according to the invention.

FIG. 3 represents the block diagram of a basic cell of FIG. 2 constituting the means for processing the depth coordinates and the attributes of the image processor. The k-th basic cell $12_k$ receives, from the basic cell which precedes it, the signals $Z_{k-1}$, $dZ_{k-1}$, $C_{k-1}$, $dC_{k-1}$, and transmits to the basic cell which follows it the signals $Z_k$, $dZ_k$, $C_k$, $dC_k$. The k-th basic cell $12_k$ likewise receives the signal $FL_k$. The signals $C_{k-1}$, $dC_{k-1}$, $Z_{k-1}$, $dZ_{k-1}$ and $OE_{k-1}$ enter a flip-flop with five inputs $62_k$, which is controlled by a clock H, at connections 77, 78, 75, 76 and 79 respectively,. Likewise, the signals $C_k$, $dC_k$, $Z_k$, $dZ_k$ and $OE_k$ leave a flip-flop with five inputs $63_k$, which is controlled by the clock $\overline{H}$. The signal $OE_k$ is released to the final segment of the line of visualization in the course of processing. For reasons of simplification of notation, the same name is retained in each instance for various signals on both sides of each one of the flip-flops.

The signals $Z_{k-1}$ and $dZ_{k-1}$ enter an adder $32_k$, which effects the operation under the control of the signal $FL_k$ emitted by the validation element. The value $Z_{k-1}$ enters a temporary register MT $34_k$. The result of the addition $Z_k=Z_{k-1}+FL_k\cdot dZ_{k-1}$ emerges from the basic cell $12_k$ by the connection 75, in order to be input into the following basic cell $12_{k+1}$. The output from the temporary register MT $34_k$ enters a multiplexer $36_k$, the temporary register MT $34_k$ enters a multiplexer $36_k$, the output from which enters a depth register MP $35_k$.

The output from the multiplexer $36_k$ likewise enters a comparator $37_k$, which likewise receives $Z_{k-1}$ and emits a comparison signal $UPD_k$, which is stored in the flip-flop $38_k$.

Figure 4:
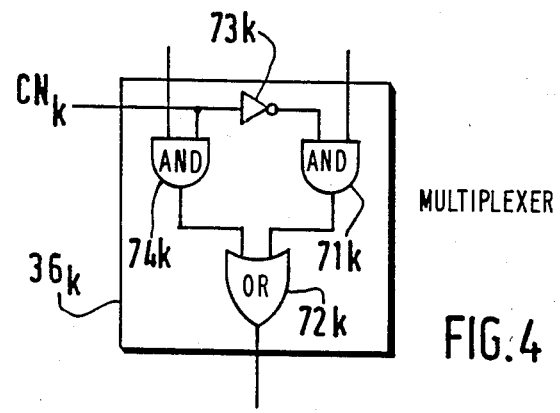
FIG. 4 shows a diagram of a multiplexer of the processing means of FIG. 3.

The registers $34_k$ and $35_k$ are shift registers. The output from the register $35_k$ is connected to one of the inputs of the multiplexer $36_k$. The latter selects either the output of the register $34_k$ or the output of the register $35_k$, depending upon the logic status of a test signal $CN_k$ emitted by a gate $39_k$ such that $CN_k=FL_k\cdot UPD_k$. The multiplexer $36_k$ is represented in FIG. 4. It comprises an AND gate $74_k$, which carries out the AND logic operation between the test signal $CN_k$ arising from the gate $39_k$ and the output of the register $34_k$. The test signal $CN_k$ is inverted by the invertor $73_k$, the output from which passes to an AND gate $71_k$ together with the output of the register $35_k$. The outputs from the AND gates $71_k$ and $74_k$ enter an OR gate $72_k$, the output from which enters the register $35_k$.

The AND gate $39_k$ receives the signal $FL_k$ and the output from the flip-flop $38_k$. The output from the AND gate $39_k$ controls the operation of a selector $30_k$, which receives the attribute $C_{k-1}$.

An adder $31_k$ receives the signals $C_{k-1}$ and $dC_{k-1}$ and carries out the operation $C_k=C_{k-1}+FL_k\cdot dC_{k-1}$ under the control of the signal $FL_k$.

The signal $C_{k-1}$ is stored in an attribute shift register $33_k$ under the control of the AND gate $39_k$ through the selector $30_k$, which can either direct the new value $C_{k-1}$ to the register $33_k$ when $CN_k=1$ or restore the old content in the opposite case. The data contained in the attribute register $33_k$ are placed on a parallel bus 13 common to all the cells via a three-status output circuit $64_k$ controlled by the signal $OE_{k-1}$. It is also possible to effect the color output in sequenced serial mode.

The shift register $34_k$ and $35_k$ carry out in synchronism shifts of the data which are stored therein. The depth register $35_k$ being looped back on itself through the multiplexer $36_k$ which has already been mentioned, the data which is contains will thus either be able to reappear regularly at its output or be replaced by those originating from the register $34_k$.

The basic principle being to replace a quoted depth Z which is too deep by another which is determined at a closer location by the processor according to the invention, it follows that, during periods of analysis which will be described in detail hereinafter, some of these Z values will remain unchanged, while others will have to be modified.

The temporary register MT $34_k$ stores all the data $ZT = Z_{k-1}$ determined anew corresponding to a line. The depth register MP $35_k$ stores all the data $Zc_k$ selected by the multiplexer $36_k$, after the operation of refreshment has been carried out and reinserts them cyclically in the comparison procedure until the full set of segments for the full set of points of the screen has been tested.

When a modification proves to be necessary in relation to the value of $Zc_k$, such as $Zc_k = Z_{k-1}$, the processor then initiates the introduction of the new value of the color attribute $C_{k-1}$ which corresponds thereto by locating the signal $CN_k = 1$.

The attribute register $33_k$ does not form the subject of any comparison procedure, and stores the attributes $C_{k-1}$ for the entire line, under the control of the decision taken in respect of the depth value $Z_{k-1}$.

The mode of operation of the means for serial processing of the pipeline type of the processor is the following.

For each segment, the pairs of values $XM_0$, $XN_0$ are introduced in serial mode, with the bit of lowest weight at the head. These values are decremented in the decrementor $10_1$ of FIG. 2. After passage of the binary element of the high weight of $XM_0$ constituting the termination of the numerical value introduced, the signal $SM_1$ of the result at the output of the decrementor $10_1$ is stored in the validation element $11_1$. The second value $XN_0$ is introduced in its turn, and in the same way the sign $SN_1$ of the result is stored in the validation element $11_1$. The latter then determines the value of the signal $FL_1 = SM_1 . \overline{SN}_1$.

When $FL_1 = 0$ the point in the course of analysis does not belong or no longer belongs to the current segment, and the data $Z_0$ pass only through the basic cell towards the following cell without adding dZ. In this case, the following relation is applicable: $ZM_1 = ZM_0$, $ZN_1 = ZN_0$.

When $FL_1 = 1$, the point in the course of analysis belongs to the current segment and validates the sequence of operations.

The data $ZM_0$ and $dZ_0$ are added in the adder $32_1$ so that $ZM_1 = ZM_0 + dZ_0$ and $ZM_0$ is stored in the temporary register $34_1$. At the same time, $ZM_0$ is compared with the content held in the depth register $35_1$ by means of the comparator $37_1$. When $ZM_0$ is less than the old value stored in the depth register $35_1$, for the same image element, the comparison signal $UPD_1$ is placed in logic status 1. Since $FL_1 = 1$, $CN_1 = UPD_1.FL_1$ where $CN_1 = 1$ and the old value stored in $35_1$ is replaced by the value $ZM_0$. In the opposite case, the old value is reintroduced at the input of the depth register $35_1$. This register stores all the values which have been refreshed, corresponding to a point of a line of visualization. The signal $CN_1$ then controls the loading of $C_0$ in the attribute register $33_1$.

Figure 5:
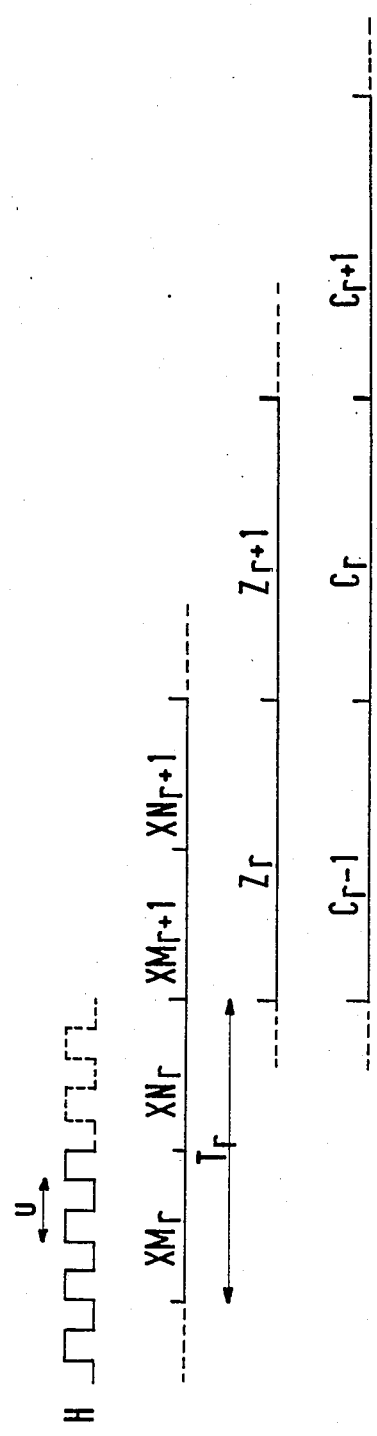
FIG. 5 shows a time diagram corresponding to the processing means of FIG. 3, FIGS. 6, 7 and 8 show an illustration of a simplified example.

The progress of the various operations which have just been described in implemented according to a "pipeline" procedure, that is to say that the operations relating to a single pixel for a given segment are shifted in time. This is indicated in the diagram of FIG. 5. All the operations are synchronized by a clock H of elementary period u, with a basic cycle of duration $T = a.u$ (where a is an integer). The operations which have been described, carried out on the co-ordinates $XM_0$, $XN_0$ of the segment, are effected first, $XM_0$ entering first with the least significant bit at the head. Each of the operations on $XM_r$ and $XN_r$, for a pixel $E_r$, in the course of a cycle $T_r$, has a duration equal to one-half of a basic cycle of duration T. The index of the pixel $E_r$ and that of the cycle $T_r$ are arbitrarily selected so as to be identical. In the course of the basic cycle following $T_{r+1}$ the operations on the data $XM_{r+1}$ and $XN_{r+1}$ are carried out simultaneously with the operations on the rate of the depth $Z_r$. In the course of the following basic cycle $T_{r+2}$, the operations on the data $XM_{r+2}$ and $XN_{r+2}$ are carried out simultaneously with the operations on the rate of the depth $Z_{r+1}$ and on the attribute $C_r$. This triple pipeline mode permits execution of the operations in a short time.

In order to initialize the registers $35_k$ and $33_k$ at each line start, the signal $OE_k$ forces the output $UPD_k$ of the comparator $38_k$ to 1, which causes the loading of the parameters Z and C of the base segment.

Figure 6:
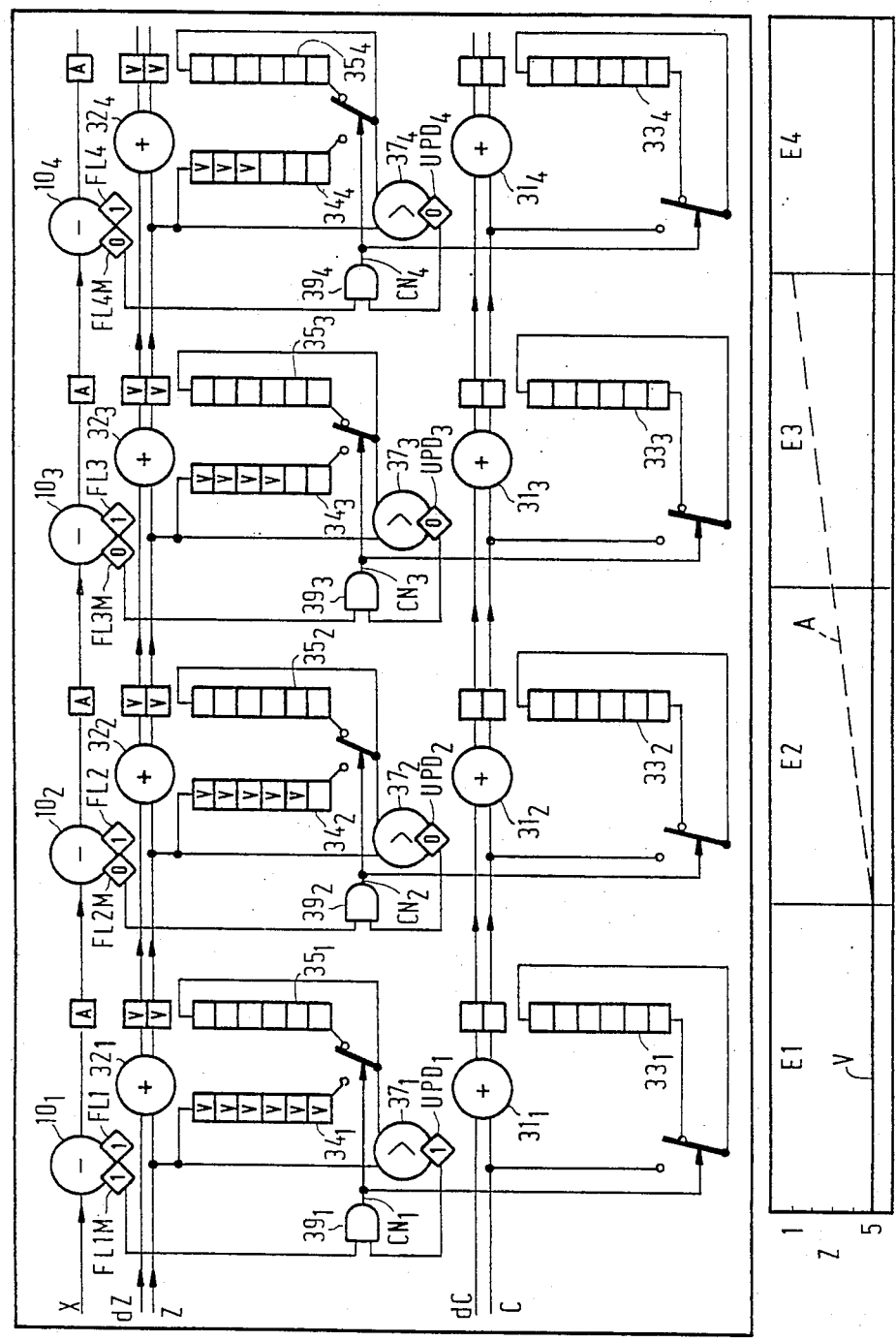
Figure 7:
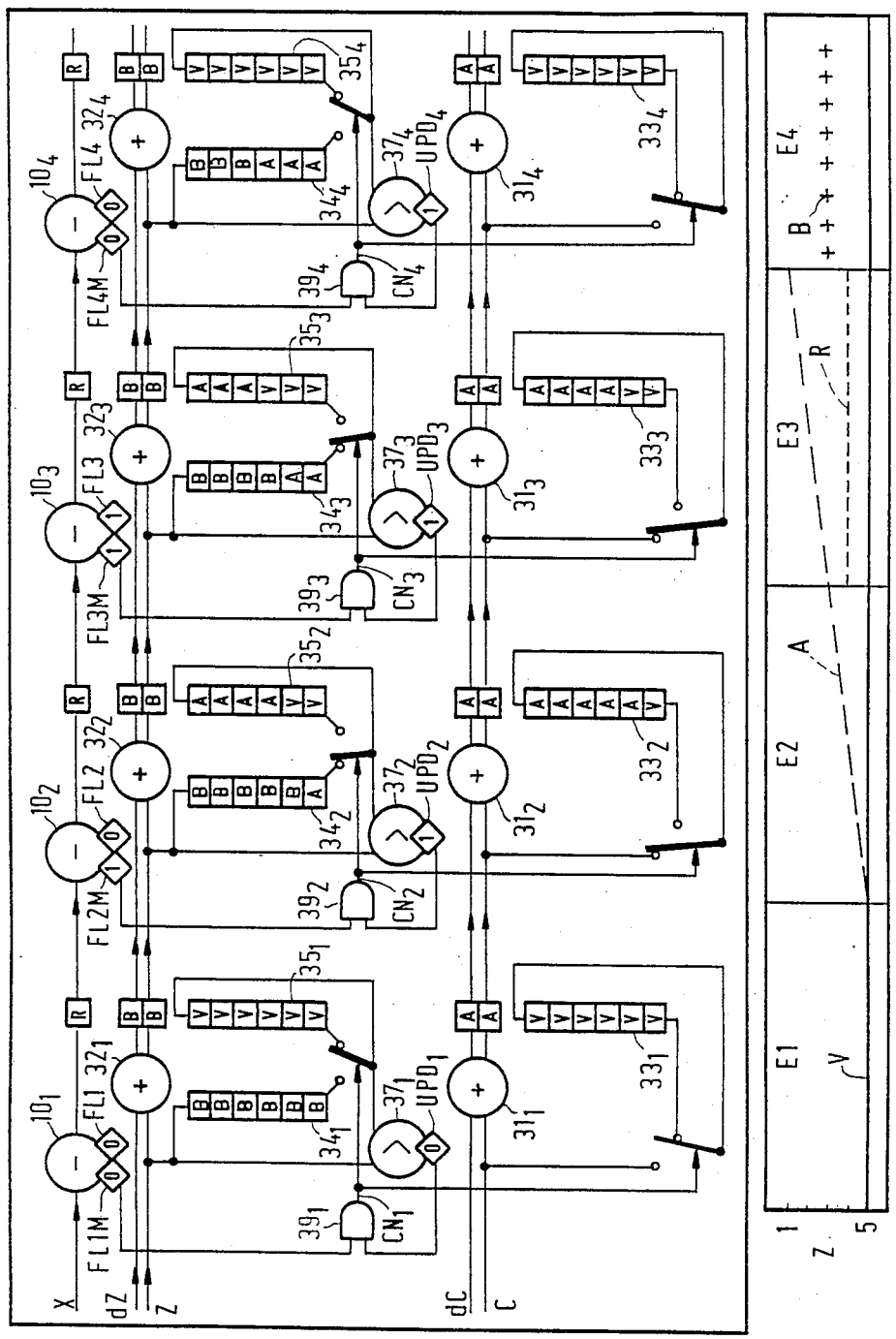
Figure 8:
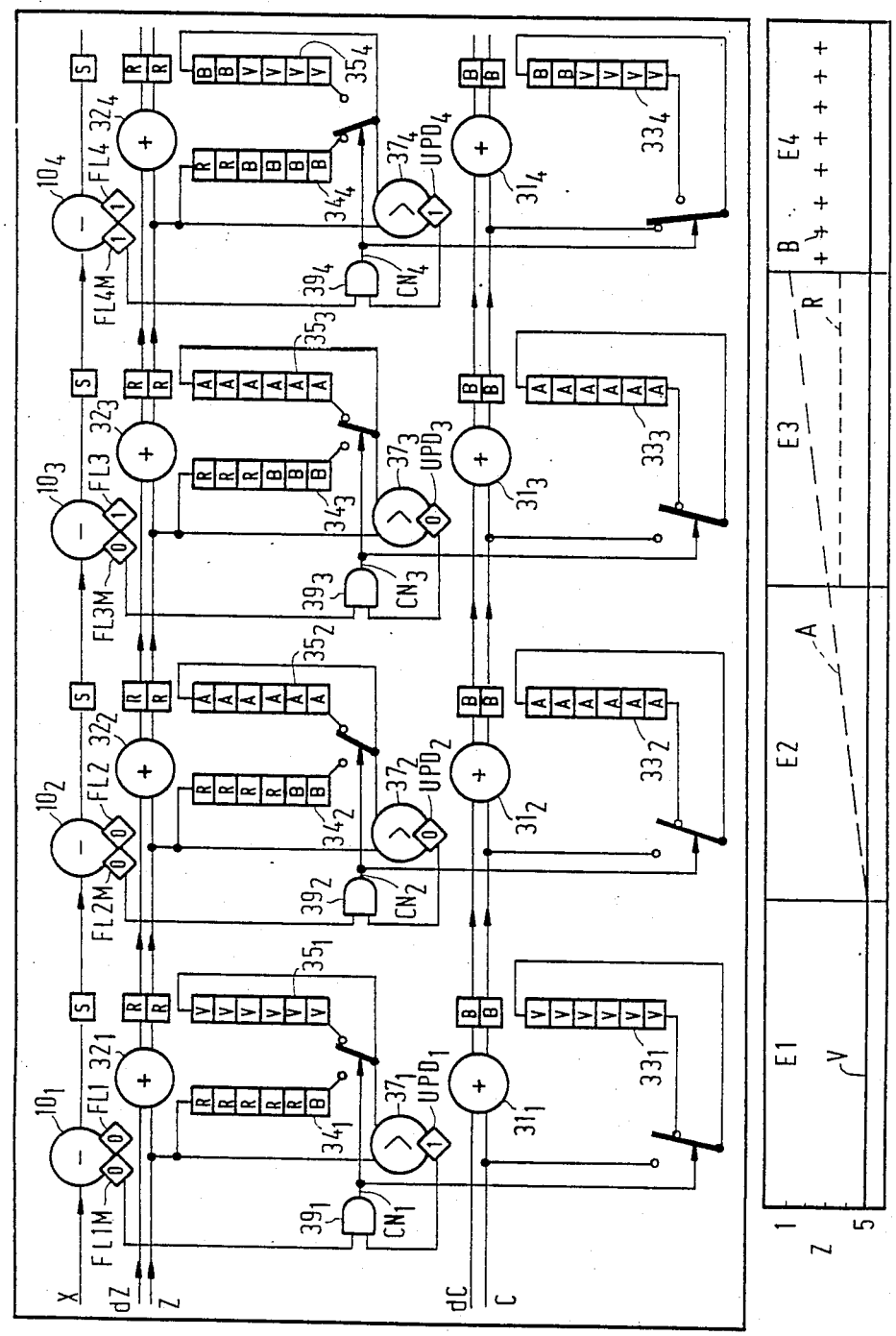

In order to illustrate, in a very simplified case, the mechanism of operation of the means of serial processing of the pipeline type, FIGS. 6, 7 and 8 show the status of these means at the conclusion of three successive steps.

Let us consider the successive processing of the four segments in the following order:

| | | | | |
|---|---|---|---|---|
| segment V | $XM_o = 0$ | $XN_o = 4$ | $Z_o = 5$ | $dZ_o = 0$ |
| segment A | $XM_o = 1$ | $XN_o = 3$ | $Z_o = 5$ | $dZ_o = -2$ |
| segment B | $XM_o = 3$ | $XN_o = 4$ | $Z_o = 2$ | $dZ_o = 0$ |
| segment R | $XM_o = 2$ | $XN_o = 3$ | $Z_o = 3$ | $dZ_o = 0$ |

In order to simplify the illustration, $XM_o$ and $XN_o$ are coded on 3 bits and $Z_o$, $dZ_o$, $dZ_o$, $C_o$ and $dC_o$ are coded on 6 bits. A basic cycle T corresponding to the processing time of one segment, thus includes 6 elementary periods of the clock.

Each elementary cell is allocated to an image point. Thus, the elementary cell of index 2 is allocated to the image point E2. The corresponding markers used in the aforementioned circuit diagram are shown in these illustrations.

CYCLE T1

The segment V is processed first. The decrementors $10_1$, $10_2$, $10_3$, $10_4$ operate on $XM_o$ and $XN_o$, and the flags $FL_1$, $FL_2$, $FL_3$, $FL_4$ are located successively at 1 because 4 image points are involved, and validate the segment V in the cells E1, E2, E3, E4 at the end of the first cycle time T1. FIG. 6 shows the status at the end of the following cycle T2, relative to the cell E1.

CYCLE T2

The positioning of the flags $FL_1$, $FL_2$, $FL_3$, $FL_4$ for the segment V are transferred progressively into the flags $FL_1M$, $FL_2M$, $FL_3M$, $FL_4M$ which maintain the locations which will be used with a shift cycle.

At the conclusion of the cycle T2, this transfer will have been carried out for the cell 1, and the value $FL_1=1$ will thus be found in the flag $FL_1M$. For the other cells, this transfer will take place only during the cycle T3, in which case, in the course of each elementary period u, the flags $FL_kM$ will be progressively filled, and where the values of $FL_k$ for the segment A will then replace the values transferred to $FL_kM$.

The decrementors operate on the segment A and the values $FL_1=0$, $FL_2=1$, $FL_3=1$, $FL_4=0$ are determined. The segment V having previously been validated, the operation $Z_V+dZ_V$ is carried out, and the result is stored in the stores $34_1$, $34_2$, $34_3$, $34_4$. At the issue of the cycle T2, each of the stores is still only incompletely charged. The result $Z_V+dZ_V$ is also submitted to the comparators $37_1$, $37_2$, $37_3$, $37_4$, which will progressively compare these values with the values (=base values) stored in the depth registers $35_k$ and generate the signals $UPD_k$. The signals $UPD_k$ are then submitted to th AND gates $39_k$ in order to form, together with the flags $FL_k$, the signals $CN_k$, which will then determine the position of the multiplexers at the output of the registers $34_k$ and $35_k$.

CYCLE T3

The decrementors operate on the segment B. The cells E1, E2, E3 are not involved. The cell E4 is involved. The flags $FL_1$, $FL_2$ and $FL_3$ are located progressively at 0 in the cells E1, E2 and E3, and then the flag $FL_4$ at 1 in the cell E4.

The calculation $Z_A+dZ_A$ is carried out for the segment A and compared with the $Z_V$ values stored in the register $35_2$ and $35_3$ of the cells E2 and E3, because in the case of the segment A only the calculation in the cells E2 and E3 is validated. The signals $UPD_2=1$, $UPD_3=1$ are generated.

The calculation of $C_V+dC_V$ is carried out for the segment V in the cells E1, E2, E3, E4. Since, for the segment V, the various flags $FL_k$ had the value 1, and since the various signals $CN_k$ were also equal to 1, the values $C_V+dC_V$ will be stored in the stores $33_k$. FIG. 7 shows the status at the end of the following cycle T4, relative to the cell E1.

CYCLE T4

The locations of the flags FL are transferred progressively to the flags FL.M.
The decrementors operate on the segment R ($FL_1=FL_2=FL_4=0$; $FL_3=1$). In the cells E2 and E3, the flags $FL_2M$ and $FL_3M$ and the flags UPD2 and UPD3 being positioned at 1, $CN_2$ and $CN_3$ are likewise positioned at 1, and they command the the multiplexers in order to replace, in the cells $E_2$ and $E_3$, $Z_V$ of the segment V by $Z_A$ of the segment A, because $Z_A$ is less than $Z_V$.

The calculation $Z_B+dZ_B$ is carried out for the segment B in the cells E4.

The calculation $C_A+dC_A$ is carried out in the cells E2 and E3, since $FL_2M$ and $FL_3M$ are positioned at 1 (cells involved in connection with this segment). $FL_1M$ and $FL_4M$ are positioned at 0. Accordingly, the addition is not carried out, but updating is carried out in the cells E2 and E3, since $CN_2$ and $CN_3$ are positioned at 1.

FIG. 8 shows the status at the end of the following cycle T5 relative to the cell E1.

CYCLE T5

The decrementors process a following segment S, $Z_B$ replaces Z stored in the cell E4. Z values stored in the cells E1, E2, E3 are looped on themselves, $Z_R$ is compared with Z stored, determined by the position of the multiplexers;

no updating of the attributes in the cells E1, E2, E3 (looping of the registers on themselves) because the segment B is not relevant to these cells, progressive updating of $C_B$ in the cell E4.

On account of the operation in the pipeline mode, the stores are incompletely filled at the end of each of these cycles, and the operation is terminated only in the course of the following cycles.

A description has now been given of the means for serial processing, of the pipeline type, to which there are supplied parameters of polygons which have previously been converted into parameters of a set of segments ($M_0$, $N_0$).

Software carrying out this conversion is defined in accordance with the following procedure:
Software for generation of segments.
Initialization:
For each polygon:
Calculate dZ;
For each edge, for example the edge q extending from the point A to the point D:

Calculate $LY_q = Y_D - Y_A$
$IX_q = (X_D - X_A)/LY_q$; $IZ_q = (Z_D - Z_A)/LY_q$
$IC_q = (C_D - C_A)/LY_q$;

The same operations are carried out for all the edges.
Determine the minimum Y of the polygon=Ymin and the first edge encountered, starting from the point A, when turning in a given sense:

$XM_0 = X_A$, $ZM_0 = Z_A$, $IXM_0 = IX_q$, $IZM_0 = IZ_q$,
$ICM_0 = IC_q$, $LYM_0 = LY_q$, $XN_0 = X_A$, $ZN_0 = Z_A$,
$IXN_0 = IX_{q-1}$, $IZN_0 = IZ_{q-1}$, $ICN_0 = IC_{q-1}$,
$LYN_0 = LY_{q-1}$;

Using the notation q−1 to refer to the edge placed before the edge q when selecting the clockwise direction,
Initialize to zero the list of polygons intersecting the line of visualization, which gives the active list;
Calculation of the segments:
For each line of visualization such as Y=LB:
For each polygon with Ymin=LB:
enter the polygon in the active list.
For all the polygons of the active list:
Decrement LY of the right-hand and left-hand edges: $LYM_0=LYM_0-1$, $LYN_0-LYN_0-1$
Add the right-hand and left-hand increments for X, Z and C
Removal of the segment:

$XM_0$, $XN_0$, $ZM_0$, $dZ$
$CM_0$, $INC = (CM_0 - CN_0)/(XM_0 - XN_0)$.

If $LYM_0=0$
$LYN_0=0$ removal of the polygon from the active list
$LYN_0\neq 0$ left-hand edge=following edge updating of the left-hand increments.

If $LYM_0 \neq 0$
    $LYN_0 = 0$ right-hand edge = preceding edge updating of the right-hand increments.

The converting means are then constituted by the software operating on a computer, a microcomputer or a microprocessor, which also effects the storage of the basic data. The means for serial processing of the pipeline type are then combined, for example in the form of an integrated circuit, and then constitute the image processor according to the invention. It is then connected to a visual display processor, which provides the restored image.

A description will now be given of the converting means, which are constituted by a circuit for the conversion of parameters of polygons into parameters of segments. This may constitute an independent circuit in the form, for example, of an integrated circuit. The image processor then includes means for serial processing, of the pipeline type, and the said conversion circuit which receives its basic data from an image store which stores the parameters of the polygons.

Figure 9:
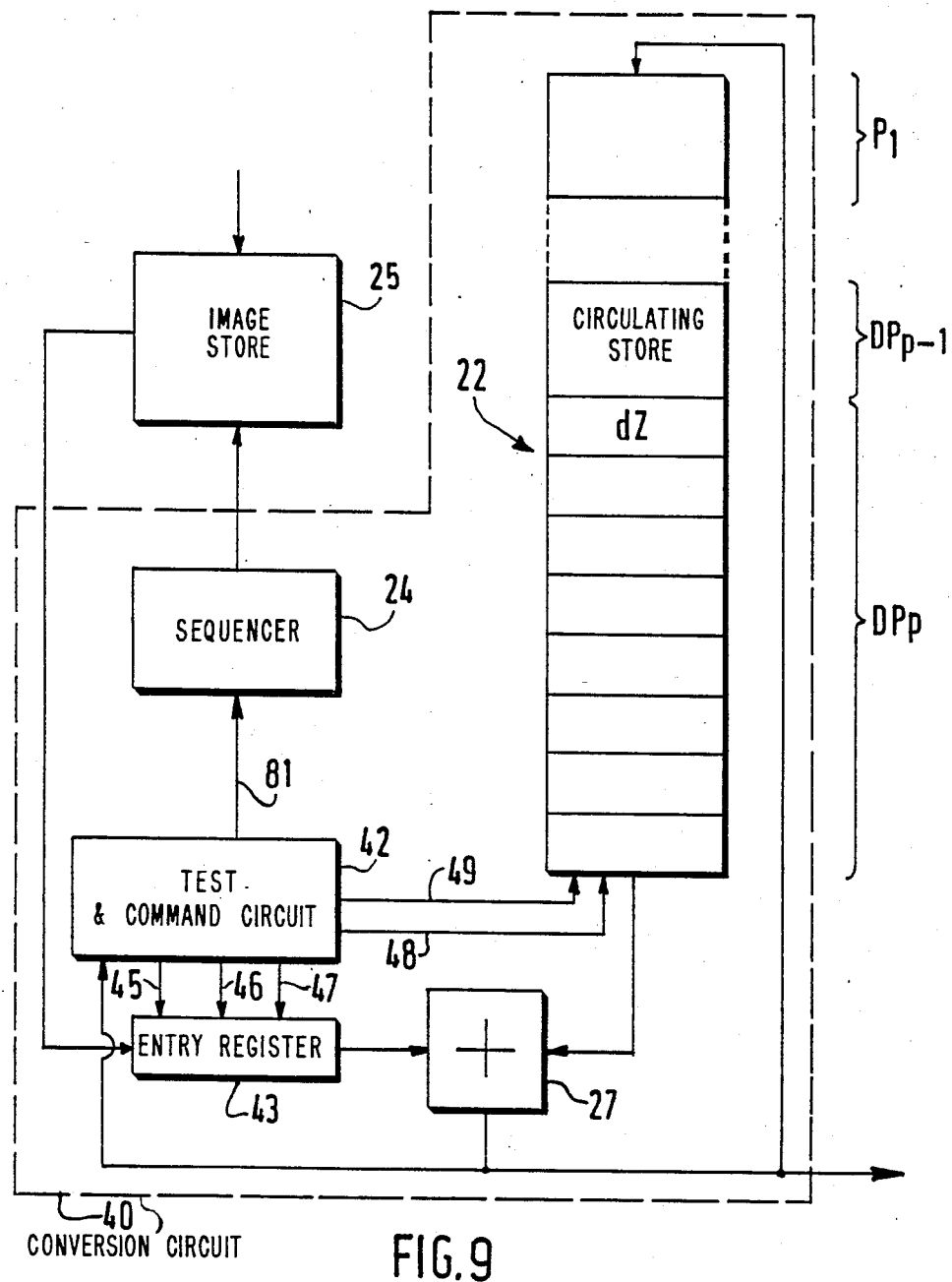
FIG. 9 shows a block diagram of the means for the conversion of the parameters of the polygons into parameters of segments.

FIG. 9 shows the block diagram of the converting means constituted by a conversion circuit 40. They include an adder 27, which receives at one input the output of an entry register 43 and at the other input the output of a circulating store 22, which receives at its input the output of the adder 27. The circulating store 22 may be constituted by a shift register in order to operate in synchronism with the means for serial processing of the pipeline type. It stores the data $DP_p$ relating to each polygon $P_p$ intercepted by the line of visualization. The entry register 43 receives the parameters of the polygons from an image store 25 which is loaded previously from outside. The loading of the entry register 43 is controlled by a command and test circuit 42, which controls the operation of the conversion circuit as well as the calls for reading of the image store through a sequencer 24.

The parameters of the polygons are stored in the image store, for example, with the nature and the scheduling of the parameters indicated on Table 1 given above. With the aid of the commands (RAZO) 47 and (RAZ) 48, the entry register 43 and the circulating store 22 are set to zero in order to initialize the loading of the data. The command (LOAD) 45 effects the loading of the entry register 43. To this end, the sequencer 24 receives a command 81 from the test and command circuit 42, which will cause the reading of data into the image store. These data will be transmitted via the entry register 43 and the adder 27 to the circulating store 22, which will then be loaded with $dZ$, $CM_0$, $XM_0$, $LYd$, $Zn_0$, $CN_0$, $XN_0$, $LYg$ of the polygon, $P_p$. As this store 22 operates in a loop, it is necessary to give it a sufficient but not excessive size, in order to avoid dilation of the duration of the processing. With the number of parameters selected for each polygon, such as those indicated on Table 1, the possibility of storing 32 polygons is an acceptable dimension. This permits processing in real time.

The operation of the conversion circuit 40 necessitates, in each cycle, execution of the following operations:

the extraction, by shifting, of a data word from the circulating store 2 and loading of its input by the output of the adder 27;

loading of the entry register 43 by the data IX, IZ, IC, read in the image store, not loaded into the store 22;

generation of the address of the following data item to be read into the image store, addition of the outputs from the store 22 and from the register 43.

The following additions and transfers are then carried out: $X \leftarrow X + IX$, $Z \leftarrow Z + IZ$, $C \leftarrow C + IC$, $LY \leftarrow LY - 1$ where the symbol $\leftarrow$ indicates that the new value $(X + IX)$ replaces the old value X. The decrementation of one unit of the length of the edge may be carried out easily by positioning the output of the entry register 43 at the value $-1$ by means of the command CONS 46.

The parameter dZ of a polygon is a constant for each polygon, and does not need to undergo any modification. Nevertheless, for the sake of simplification of processing, it is introduced into the parameters of the polygons, but its passage in the adder 27 does not alter it by positioning the output of the entry register 43 at zero by means of the command RAZ 47. The command and test circuit 42 carries out the test of the length of the right-hand and left-hand edges of the polygons. When, after processing, the circulating length LY reaches the value zero, the edge concerned has finished its application and must be replaced by the following edge if processing of the polygon is not finished, or by a new polygon in the opposite case.

Figure 10:
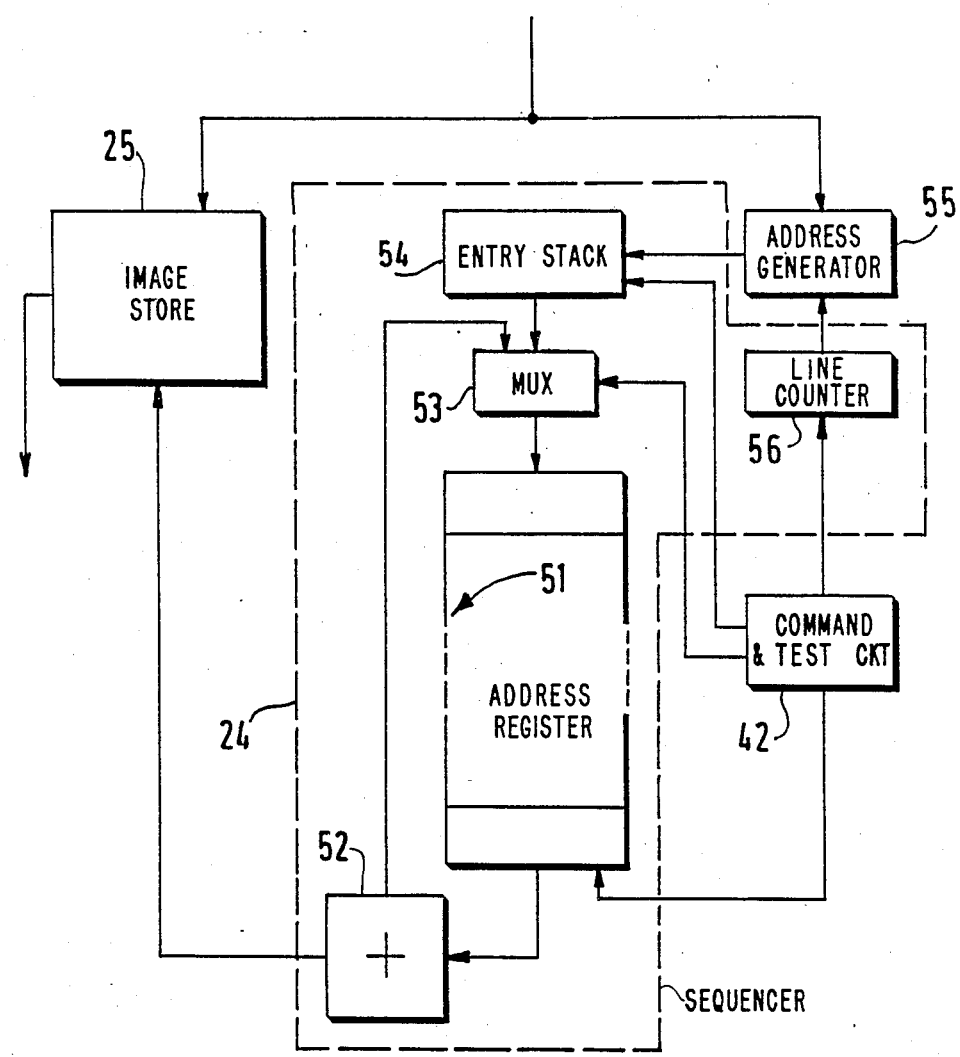
FIG. 10 shows a block diagram of the address sequencer of the converting means of FIG. 9.

The sequencer 24 is represented in greater detail in FIG. 10. It generates the addresses of the data which are to be read into the image store 25. In order to do this, it is necessary to store in an address register 51 the following data:

the absolute address of the polygon
the number of the left-hand edge Ng
the number of left-hand edges Narg
the number of the right-hand edge Nd
the number of right-hand edges Nard
flags indicating the status of the polygon.

These flags are, for example:

PA = 0 if the polygon is inactive, that is to say, if the polygon is not intercepted by the line of visualization.

DP = 0 if the next passage in the means for converting the polygon corresponds to the initialization phase.

Dg = 0 (or Dd = 0, respectively) if the next run in the means for converting the polygon corresponds to a phase of change of left-hand edge (or of right-hand edge, respectively).

The simplest way of providing these data is to preserve them in an addresss register 51 similar to the circulating store 22 of data, and which may be updated for a change of polygon or of edge. In order to achieve this, a multiplexer 53 selects the output of an entry stack 54 or that of an adder 52 under the control of the command and test circuit 42. The sequencing of the operations is understaken in the following manner.

A line counter 56 is incremented at each line. The addresses of the polygons commencing at this line are loaded into the entry stack 54. These addresses are generated externally in the generator 55, which receives instructions from a central unit. A shift is carried out on the address register 51 every 8 elementary clock periods, which corresponds to the 8 following operations of the processing of the polygon:

$LY_g \leftarrow LY_g - 1$ $X_g \leftarrow X_g + dX_g$ $Z_g \leftarrow Z_g + dZ_g$ $Cg \leftarrow Cg + dCg$ $LYd \leftarrow LYd - 1$ $Xd \leftarrow Xd + dXd$ $Cd \leftarrow Cd + dCd$ $dZ \leftarrow dZ + 0.$ Thus, all the 8 elementary clock periods u, which corresponds to the determination of the parameters of the segment determined by the intersection of the polygon with the line of visualization, a new polygon address is presented at the output of the register 51 to process the following polygon. The address sequencer 24 then generates the addresses of the various data sought in the image store. This sequence of addresses is associated with the values of the flags PA, DP, Dg, Dd. These data which have been read are then passed into the entry register 43.

Depending upon the results of the tests carried out on LYg and LYd, reloading for the next shift, on the address register 51, of the new addresses which are of use for the following run takes place in the following manner:

When PA=0 (inactive polygon) or when LYg=0 and Ng=Narg (detection of an end of a polygon) and if the entry stack 54 is not empty (i.e. there is a polygon commencing at the following line), the address of this new polygon is loaded into the address register 51 and the flags are positioned at PA=1 (active polygon) and at DP=0 (initialization), When LYg=0 or LYd=0 and Ng is different from Narg (detection of an end of an edge), Nd (or Nd) is incremented and Dg is set to zero (or Dd to 0), When nothing is detected, the flags remain unchanged.

The various command signals carrying out this procedure are generated by a microprogrammed command structure.

The address word stored in the register 51 for each polygon presents, first of all, a first field constituted by $AP_p$, Narg, Ng, Nard, Nd, ($AP_p$ being the index of the polygon) which permits generation of the addresses of the data, and a second field constituted by PA, DP, Dd, Dg, which indicate the status of the polygon. This register 51 stores an address word per polygon having the composition:

| APj | Narg | Ng | Nard | Nd | PA | DP | Dd | Dg |

Thus, it is necessary to have 32 words of this type for a processing capacity of 32 segments per line.

In order to increase the processing performance level, several processors may be used in parallel. To this end, each processor supplies not only the parameters C, but also the parameters Z, processing simultaneously and separately two sets of segments relating to the same line of visualization. A comparison of the parameters Z permits a selection of the color to be displayed to be made.

It is also possible to operate with 2 pipeline levels, by determining the value at the origin Zorg such that the segment MoNo intersects the axis OZ. It is then possible to calculate Zorg+dZ for each value of $X_k$ and to validate the comparison under the control of the signal $FL_k$.

In order to process the transparency, it is possible to allocate a transparency flag to a segment which appears in relation to the signals $CN_k$ in order to block, for example every alternate clock count, the updating of the parameters $Z_k$ and $C_k$ of the transparent segment.

What is claimed is:

1. An image processor for processing a three-dimensional representation of an object to determine two-dimensional representation parameters to permit displaying an image of the represented object on a display screen, said image processor comprising:

means for inputting a plurality of sets of parameters each set corresponding to a single polygon in a plurality of polygons which represent said three-dimensional object at a predetermined angle of observation, each set of parameters defining a set of line segments which constitute the intersection of each polygon with a plurality of planes perpendicular to a plane of visualization through each line of visualization on the display screen, the plane of visualization corresponding to the plane of the display screen and the line of visualization corresponding to a line of visual elements on the display screen; and means for determining the parameters of a plurality of visual elements in a line of visualization comprising means for simultaneously determining the parameters of a plurality of line segments and means for serially processing each parameter in a set of parameters, said serial processing being of the pipeline type, and for selecting and storing the parameters of line segments closest to the plane of visualization.

2. An image processor according to claim 1, wherein the parameters defining each line segment are supplied to the processor in the form of coordinates of extremities $XM_0$, $XN_0$, depth and depth increments coordinates $Z_0$ and $dZ_0$, and attribute and attribute increments parameters $C_0$ and $dC_0$ relating to each segment, the parameters of segments being introduced bit by bit into the means for serial processing of the pipeline type.

3. An image processor according to claim 1, wherein the parameters defining each line segment are supplied to the processor in the form of coordinates of extremities $XM_0$, $XN_0$, depth and depth increments coordinates $Z_0$ and $dZ_0$, and attribute and attribute increments parameters $C_0$ and $dC_0$ relating to each segment, the parameters of segments being introduced by the groups of bits into the means for serial processing of the pipeline type.

4. An image processor according to claim 1, wherein the parameters of the line segments being supplied to the processor are in the form of coordinates of extremities $XM_0$, $XN_0$, depth and depth increments coordiantes $Z_0$ and $dZ_0$, and attribute and attribute increments parameters $C_0$ and $dC_0$ relating to each segment, and the means for serial processing of the pipeline type comprises n blocks each allocated to the serial processing of the parameters of one of the n visual elements of a line of visualization, the k-th block comprising (with $1 \leq k \leq n$):

a decrementor receiving the coordinates ($XM_{k-1}$, $XN_{k-1}$) which it decrements by one binary unit such that: $XM_k = XM_{k-1} - 1$, $XN_k = XN_{k-1} - 1$;

a validation element which receives, respectively, the signals ($SM_k$, $SN_k$) of the results ($XM_k$, $XN_k$) supplied by the decrementor, and determines a validation signal $FL_k$ such that $FL_k = SM_k \cdot \overline{SN_k}$ (the symbol (.) designating the AND logic operation), with $FL_k=1$ if the image element analyzed is affected by the coordinates ($XM_k$, $XN_k$), and $FL_k=0$ in the opposite case; and a basic cell:
  which receives the coordinates $Z_{k-1}$, $dZ_{k-1}$, the parameters $C_{k-1}$, $dC_{k-1}$, and the signal $FL_k$;
  which determines, under the control of the signal $FL_k=1$, the coordinates $Z_k$, $dZ_k$, the parameters $C_k$, $dC_k$ for the following basic cell;
  which compares the coordinates $Z_{k-1}$ with old stored values $Zc_k(\text{old})$ and stores values $Zc_k(\text{new})$ such that: $Zc_k(\text{new})=Zc_k(\text{old})$ if $Z_{k-1} \geq Zc_k(\text{old})$ and $Zc_k(\text{new})=Z_{k-1} < Zc_k(\text{old})$;
  which stores the attribute paramters $C_{k-1}$ associated with the new stored values $Zc_k$; and
  which transmits the attributes parameters $C_{k-1}$ to an external bus.

5. An image processor according to claim 4, wherein the operation of the processor is implemented on a sequence of cycles T each comprising units of time u, generated by a clock H, so that $T=a \cdot u$ (a being an integer, the length of the word), and in that the n basic cells comprise, for the k-th basic cell with $1 \leq k \leq n$:

an input flip-flop which validates, on the clock H the signals $Z_{k-1}$, $dZ_{k-1}$, $C_{k-1}$, $dC_{k-1}$, and a signal $OE_{k-1}$ indicating the end of the exploration of the line of visualization;

an adder which determines the coordinate $Z_k$ such that:

$Z_k=Z_{k-1}+dZ_k$ if $FL_k=1$, $Z_k=Z_{k-1}$ if $FL_k=0$;

a temporary register which stores the value $Z_{k-1}$;
a depth register which stores the new value $Zc_k$ allocated to each image point, such that:

$Zc_k(\text{new})=Zc_k(\text{old})$ if $Z_{k-1} \geq Zc_k(\text{old})$, and $Zc_k(\text{new})=Z_{k-1}$ if $Z_{k-1} < Zc_k(\text{old})$;

a comparator which compares the value $Z_{k-1}$ presented at the input of the adder with the refreshed values $Zc_k$ stored in the depth register, and which supplies a comparison signal $UPD_k$ such that:

$UPD_k=1$ if $Z_{k-1}\text{new} < Zc_k(\text{refreshed})$;

a multiplexer which orients, under the control of a signal $CN_k$, the output of the depth register towards the comparator when $CN_k=0$, and the output of the temporary register towards the input of the depth register when $CN_k=1$;
a flip-flop which stores the comparison signal $UPD_k$;
a logic AND gate which supplies the signal $CN_k=FL_k \cdot UPD_k$;
a further adder which determines an attribute parameter $C_k$ such that:

$C_k=C_{k-1}+dC_{k-1}$ if $FL_k=1$;

an attribute register;
a selector, controlled by the signal $CN_k$, which orients towards the attribute register the new value $C_{k-1}$ if $Zc_k(\text{new})$ is different from $Zc_k(\text{old})$ and causes the old value $C_{k-1}$ to circulate if $Zc_k(\text{new})$ is equal to $Zc_k(\text{old})$;
an output circuit which supplies the data $C_{k-1}$ to an output bus when all the segments of all the polygons have been examined; and
an output flip-flop which validates, on the clock $\overline{H}$ which is the inverse of the clock H, the signals $Z_k$, $dZ_k$, $C_k$, $dC_k$ and $OE_k$ supplied for the subsequent basic cell.

6. An image processor for processing a three-dimensional representation of an object to determine two-dimensional representation parameters to permit displaying an image of the represented object on a display screen, said image processor comprising:

means for inputting parameters of each polygon in a set of polygons describing a three-dimensional object;

converting means for converting the parameters of each polygon into parameters of segments which segments constitute the intersection of each polygon with a plurality of planes perpendicular to the plane of visualization through each line of visualization of the visual display device; and means for simultaneously determining the parameters of a plurality of visual elements in a line of visualization, and serial processing means for serially processing each parameter in a set of parameters, said serial processing being of the pipeline type, and for selecting and storing the parameters of line segments closest to the plane of visualization.

7. An image processor according to claim 6, wherein the parameters of the polygons are supplied to the processor in the form of coordinates and attributes of apices and of parameters of edges of the polygons, and the converting means comprises:

an entry register for receiving the parameters of the polygons;
a circulating store;
a sequencer for controlling the reading of the data from the image store;
an adder which receives at one input the output from the entry register and at another input the output from the circulating store, said circulating store being connected to the output of the adder and having a capacity to store the parameters of the polygons intersected by the line of visualization under consideration;
a test and command circuit for controlling the sequencer and the result emerging from the adder, and for supplying command signals, when the coordinates of the extremities of the edges of the polygons have been reached, to the circulating store, to the entry register and to the sequencer;
the output of the adder supplying data comprising coordinates of extremities $XM_0$, $XN_0$, depth and depth increments coordinates $Z_0$ and $dZ_0$, attribute and attribute increments parameters $C_0$ and $dC_0$ relating to each segment, these data entering the serial processing means which comprises n blocks each allowed to the serial processing of the parameters of one of the n visual elements of a line of visualiation, the k-th block comprising (with $1 \leq k \leq n$):

a decrementor receiving the coordinates ($XM_{k-1}$, $XN_{k-1}$) which it decrements by one binary unit such that:

$XM_k=XM_{k-1}-1$, $XN_k=XN_{k-1}-1$;

a validation element which receives, respectively, the signs ($SM_k$, $SN_k$) of the results ($XM_k$, $XN_k$) supplied by the decrementor, and determines a validation signal $FL_k$ such that $FL_k=\overline{SM_k \cdot SN_k}$, (the symbol (.0 designating the AND logic operation), with $FL_k=1$ if the image element analyzed is affected by the coordinates ($XM_k$, $XN_k$) and $FL_k=0$ in the opposite case; and a basic cell:
which receives the coordinates $Z_{k-1}$, $dZ_{k-1}$, the parameters $C_{k-1}$, $dC_{k-1}$, and the signal $FL_k$;
which determines, under the control of the signal $FL_k=1$, the coordinates $Z_k$, $C_k$, and the parameters $dZ_k$, $dC_k$ for the following basic cell;
which compares the coordinates $Z_{k-1}$ with old stored values $Zc_k$(old) and stores values $Zc_k$(new) such that:

$Zc_k(new)=Zc_k(old)$ if $Z_{k-1} \geq Zc_k(old)$, and $Zc_k(new)=Z_{k-1}$ if $Z_{k-1} < Zc_k(old)$;

which stores the attributes parameters $C_{k-1}$ associated with the new stored values $Zc_k$; and
which transmits the attributes parameters $C_{k-1}$ to an external bus.

8. An image processor according to claim 7, wherein the sequencer comprises:
an address register containing the addresses for addressing to the image store the polygons in the course of processing, said address register being controlled by the test and command circuit;
an entry stack controlled by the test and command circuit for storing the addresses of the parameters of the polygons to be input;
an adder incrementing the address supplied by the output of the address register and supplying incremented addresses to address the image store, these incremented addresses being reintroduced at the input of a multiplexer which selects these incremented addresses or new addresses contained in the entry stack, under the control of the test and command circuit, in order to replace by a new polygon a polygon which has ceased to be intersected by the perpendicular plane through the line of visualization under consideration.

9. An image processor according to claim 8, wherein the operation of the processor is implemented on a sequence of cycles T each comprising units of time u, generated by a clock H, so that $T=a \cdot u$ (a being an integer, the length of the word), and in that the n basic cells comprise, for the k-th basic cell with $1 \leq k \leq n$:
an input flip-flop which validates, on the clock H the signals $Z_{k-1}$, $dZ_{k-1}$, $C_{k-1}$, $dC_{k-1}$, and a signal $OE_{k-1}$ indicating the end of the exploration of the line of visualization;
an adder which determines the coordinate $Z_k$ such that:

$Z_k=Z_{k-1}+dZ_k$ if $FL_k=1$, $Z_k=k-1$ if $FL_k=0$;

a temporary register which stores the value $Z_{k-1}$;
a depth register which stores the new value $Zc_k$ allocated to each image point, such that
$Zc_k(new)=Zc_k(old)$ if $Z_{k-1} \geq Zc_k(old)$ and $Zc_k(new)=Z_{k-1}$ if $Z_{k-1} < Zc_k(old)$;
a comparator which compares the value $Z_{k-1}$ presented at the input of the adder with the refreshed values $Zc_k$ stored in the depth register, and which supplies a comparison signal $UPD_k$ such that:

$UPD_k=1$ if $Z_{k-1}$new $< Zc_k$(refreshed);

a multiplexer unter the control of a signal $CN_k$ which directs the output of the depth register to the comparator when $CN_k=0$, and the output of the temporary register to the input of the depth register when $CN_k=1$;
a flip-flop which stores the comparison signal $UPD_k$;
a logic AND gate which supplies the signal $CN_k=FL_k \cdot UPD_k$;
a further adder which determines an attribute parameter $C_k$ such that:

$C_k=C_{k-1}+dC_{k-1}$ if $FL_k=1$;

an attribute register;
a selector, controlled by the signal $CN_k$, which directs to the attribute register the new value $C_{k-1}$ if $Zc_k$(new) is different from $Zc_k$(old) and causes the old value $C_{k-1}$ to circulate if $Zc_k$(new) is equal to $Zc_k$(old);
an output circuit which supplies the data $C_{k-1}$, to an output bus when all the segments of all the polygons have been examined; and
an output flip-flop which validates, on the clock $\overline{H}$ which is the inverse of the clock H, the signals $Z_k$, $dZ_k$, $C_k$, $dC_k$ and $OE_k$ supplied for the subsequent basic cell.

10. An image processor according to claim 7, wherein the operation of the processor is implemented on a sequence of cycles T each comprising units of time u, generated by a clock H, so that $T=a \cdot u$ (a being an integer, the length of the word), and in that the n basic cells comprise, for the k-th basic cell with $1 \leq k \leq n$:
an input flip-flop which validates, on the clock H the signals $Z_{k-1}$, $dZ_{k-1}$, $C_{k-1}$, $dC_{k-1}$, and a signal $OE_{k-1}$ indicating the end of the exploration of the line of visualization;
an adder which determines the coordinate $Z_k$ such that:

$Z_k=Z_{k-1}+dZ_k$ if $FL_k=1$, $Z_k=Z_{k-1}$ if $FL_k=0$;

a temporary register which stores the value $Z_{k-1}$
a depth register which stores the new value $Zc_k$ allocated to each image point, such that $Zc_k(new)=Zc_k(old)$ if $Z_{k-1} \geq Zc_k(old)$ and $Zc_k(new)=Z_{k-1}$ if $Z_{k-1} < Zc_k(old)$;
a comparator which compares the value $Z_{k-1}$ presented at the input of the adder with the refreshed values $Zc_k$ stored in the depth register, and which supplies a comparison signal $UPD_k$ such that:

$UPD_k=1$ if $Z_{k-1}$(new) $< Zc_k$(refreshed);

a multiplexer under the control of a signal $CN_k$ which directs the output of the depth register to the comparator when $CN_k=0$, and the output of the temporary register to the input of the depth register when $CN_k=1$;

a flip-flop- which stores the comparison signal $UPD_k$;

a logic AND gate which supplies the signal $CN_k=FL_k \cdot UPD_k$;

a further adder which determines an attribute parameter $C_k$ such that:

$$C_k = C_{k-1} + dC_{k-1} \text{ if } FL_k = 1;$$

an attribute register;

a selector, controlled by the signal $CN_k$, which directs to the attribute register the new value $C_{k-1}$ if $Zc_k(\text{new})$ is different from $Zc_k(\text{old})$ and causes the old value $C_{k-1}$ to circulate if $Zc_k(\text{new})$ is equal to $Zc_k(\text{old})$;

an output circuit which supplies the data $C_{k-1}$ to an output bus when all the segments of all the polygons have been examined; and an output flip-flop which validates, on the clock $\overline{H}$ which is the inverse of the clock H, the signals $Z_k$, $dZ_k$, $c_k$, $dC_k$ and $OE_k$ supplied for the subsequent basic cell.

11. A circuit for the conversion of parameters of polygons into parameters of segments for a processor of images of objects described in three dimensions, the conversion circuit comprising:

an entry register for receiving the parameter of m polygons Pm supplied to the image processor in the form of coordinates and attributes of apices and of parameters of edges of the polygons;

a circulating store for storing the parameters of the polygons intersected by a plane perpendicular to a plane of visualization through the line of visualization under consideration;

a first adder for receiving at one input the output from the entry register and at another input the output from the circulating store, the circulating store having its input connected to the output of the adder; and a sequencer for controlling the reading of the parameters of the m polygons Pm from the image store, comprising:

an address register containing the addresses for addressing the polygons into the image store during the course of processing;

an entry stack storing the addresses of the parameters of the polygons to be input;

a second adder for incrementing the address supplied by the output of the address register and supplying incremented addresses, some of which serve for addressing the image store;

a multiplexer having an input for receiving said incremented addresses and which selects these imcremented addresses or new addresses contained in the entry stack in order to replace by a new polygon a polygon which has ceased to be intersected by the perpendicular plane through the line of visualization under consideration; and a test and command circuit for controlling the sequencer and the result emanating from the adder, and for supplying command signals, when the coordinates of the extremities of the edges have been reached, to the circulating store, to the entry register and to the sequencer.

12. A method for determining the parameters of visual elements on a display screen for a transformed image of an object, comprising:

supplying the parameters of a set of polygons representing an object;

converting the parameters of the polygons into a set of segments constituted by the intersections of the set of polygons with a plurality of planes perpendicular to the plane of visualization of the display device each through a line of visualization of the display device;

supplying the segments to a serial processing means for serial processing of a plurality of segments, the serial processing means having n blocks corresponding to n visual elements of a line of visualization of a display device and being of the pipeline type, the segments being supplied to the serial processing means in the form of coordinates of extremities $XM_0$, $XN_0$, depth and depth increments coordinates $Z_0$ and $dZ_0$, and attribute and attribute increments parameters $C_0$ and $dC_0$ relating to each segment;

operating the serial processing means on a sequence of periods of base T, each comprising units of time u, generated by a clock, such that $T=a \cdot u$ (where a is an integer, the length of the word);

for each block k (with $1 \leq k \leq n$) of said n blocks of said serial processing means:

initializing the content of two stores MT and MP with the maximum values ZT and $Zc_k$ which they can contain;

inputting successively the coordinates $XM_{k-1}$, $XN_{k-1}$ of the extremities of a set of segments in series into a decrementor which subtracts from each unit of time u a binary unit at the coordinate $XM_{k-1}$ and at the coordinate $XN_{k-1}$ of each segment;

storing the signs of the results $SM_k$, $SN_k$ of the coordinates $XM_k$, $XN_k$ obtained after these decrementations are stored;

determining a signal $FL_k = SM_k \cdot SN_k$;

when the signal $FL_k=1$, inputting the depth coordinate and increment $Z_{k-1}$ and $dZ_{k-1}$ and the attribute parameter and increment $C_{k-1}$ and $dC_{k-1}$ into a basic cell of the block which determines a value $Z_k$ and a value $C_k$ such that:

$$Z_k = Z_{k-1} + dZ_{k-1}, C_k = C_{k-1} + dC_{k-1}$$
$$\text{if } FL_k = 1;$$
$$Z_k = Z_{k-1}, C_k = C_{k-1} \text{ if } FL_k = 0;$$

loading into the store MT the value $Z_{k-1}$ in order that $ZT = Z_{k-1}$;

commencing with the least significant bit, for each unit of time u, comparing each binary element of the value $Z_{k-1}$ with each binary element of the value $Zc_k$ contained in the store MP, and generating a comparison signals $UPD_k$ such that $UPD_k = 1$ if $Z_{k-1} < Zc_k$, and determining a signal $CN_k = FL_k \cdot UPD_k$;

when $CN_k = 1$, replacing the value $Zc_k$ by the value $ZT = Z_{k-1}$ in the couorese of the period T, and inputting the value $C_{k-1}$ into an attribute register;

when $CN_k = 0$, circulating the data $Zc_k$ from the output of the store MP to the input of the same store during a cycle of duration T;

simultaneously carrying out these same steps for the n successive blocks in such a manner that a given block k receives its data from the preceding block (k−1) and transmits them to the subsequent block (k+1), each block effecting at a given instant, according to a pipeline procedure:

the determination of the values $XM_0$, $XN_0$ during cycle $T_r$;

the determination and storage of the data Z relating to previous cycle $T_{r-1}$;

the determination and the storage of the data C relating to preceding cycle $T_{r-2}$; and updating of the Z value refreshed; and when all the segments have been completely explored, applying all the data Ck emerging from the k blocks to an output bus over a certain number of cycles T determined by the number of segments included in the line of visualization under consideration.

* * * * *